United States Patent
Bethea et al.

(10) Patent No.: US 8,406,412 B2
(45) Date of Patent: Mar. 26, 2013

(54) SYSTEM AND METHOD FOR CALL FLOW GENERATION VIA REAL-TIME TRACKING OF GUIDED PROBLEM RESOLUTION

(75) Inventors: Timothy J Bethea, Sunnyvale, CA (US); Neil H Boyette, Oregon City, OR (US); Isaac Kam-Chak Cheng, San Jose, CA (US); Vikas Krishna, San Jose, CA (US); Yolanda A Rankin, San Jose, CA (US); Yongshin Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/714,368

(22) Filed: Feb. 26, 2010

(65) Prior Publication Data
US 2011/0211687 A1    Sep. 1, 2011

(51) Int. Cl.
*H04M 3/00* (2006.01)
*H04M 5/00* (2006.01)

(52) U.S. Cl. ............... 379/265.01; 379/266.07; 379/309

(58) Field of Classification Search ............. 379/265.01, 379/266.07, 309
See application file for complete search history.

(56) References Cited

U.S. PATENT DOCUMENTS

| | | | |
|---|---|---|---|
| 6,829,349 B1 | 12/2004 | Neale et al. | |
| 6,879,685 B1 * | 4/2005 | Peterson et al. | 379/265.11 |
| 7,231,210 B1 | 6/2007 | Croak et al. | |
| 2005/0235255 A1 | 10/2005 | Agapi et al. | |
| 2008/0304650 A1 | 12/2008 | Catlin et al. | |
| 2009/0080641 A1 | 3/2009 | Fitzgerald | |

* cited by examiner

*Primary Examiner* — Quynh Nguyen
(74) *Attorney, Agent, or Firm* — Cantor Colburn LLP

(57) ABSTRACT

Systems and methods for adapting an existing call flow wherein the call flow further comprises an associated data set, comprising: activating the existing call flow, the existing call flow generating a series of questions designed to obtain information from a caller; determining if an exception condition has occurred; allowing a user to activate an exception call flow in response to the exception condition; retaining the data set associated with the call flow when the exception condition occurred; adapting the data set such that the call flow addresses the exception condition; analyzing the adapted data set to determine if it is unique; and, modifying the existing call flow to incorporate the adapted data set if the adapted data set is unique.

22 Claims, 4 Drawing Sheets

SYSTEM AND METHOD FOR CALL FLOW GENERATION VIA REAL-TIME TRACKING OF GUIDED PROBLEM RESOLUTION

FIELD OF THE INVENTION

Embodiments of the disclosure relate generally to the field of data processing systems. For example, embodiments of the disclosure relate to systems, methods and computer programs for call flow generation via real-time tracking of guided problem resolution that may be typically used in a call center. A call center is a centralized office that receives a large volume of requests by telephone. In many cases, a call center is used for product support or information inquiries from consumers. A call center is often operated through an extensive open workspace with workstations that typically include a computer; a telephone set/headset connected to a telecom switch, and one or more supervisor stations. It can be independently operated or networked with additional centers, often linked to a corporate computer network, including mainframes, microcomputers and Local Area Networks (LAN's).

Typically, the agents are referred to as Customer Service Representatives or users. Most major businesses use call centers to interact with their customers. Examples include utility companies, mail order catalogue retailers, and customer support for computer hardware and software. Some businesses use call centers to service internal functions. Examples of this type include help desks, retail financial support and sales support. Customer Service Representatives (CSR's) working in call centers make heavy use of problem determination and resolution processes referred to as "call flows" as a guide for resolving customer service requests. These call flows can be as basic as a flowchart or as complex as a script executed on the CSR's computer that prompts for user data and chooses paths in the script according to the data received. Typically, software developers rely on instructions created by experts in the particular product or service being supported to write specialized and detailed scripts for executable call flows. However, this need to rely on call flows created by experts sharply limits the short-term adaptability of any call center. Thus, there is a need for a system, method and computer program for call flow generation via real-time tracking of guided problem resolution.

SUMMARY

Methods, systems and computer programs for adapting an existing call flow wherein the call flow further comprises an associated data set, comprising: activating the existing call flow, the existing call flow generating a series of questions designed to obtain information from a caller; determining if an exception condition has occurred; allowing a user to activate an exception call flow in response to the exception condition; retaining the data set associated with the call flow when the exception condition occurred; adapting the data set such that the call flow addresses the exception condition; analyzing the adapted data set to determine if it is unique; and, modifying the existing call flow to incorporate the adapted data set if the adapted data set is unique.

This illustrative embodiment is mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Embodiments of the disclosure relate generally to the field of data processing systems. For example, embodiments of the disclosure relate to systems, methods and computer programs for call flow generation via real-time tracking of guided problem resolution.

Figure 1:
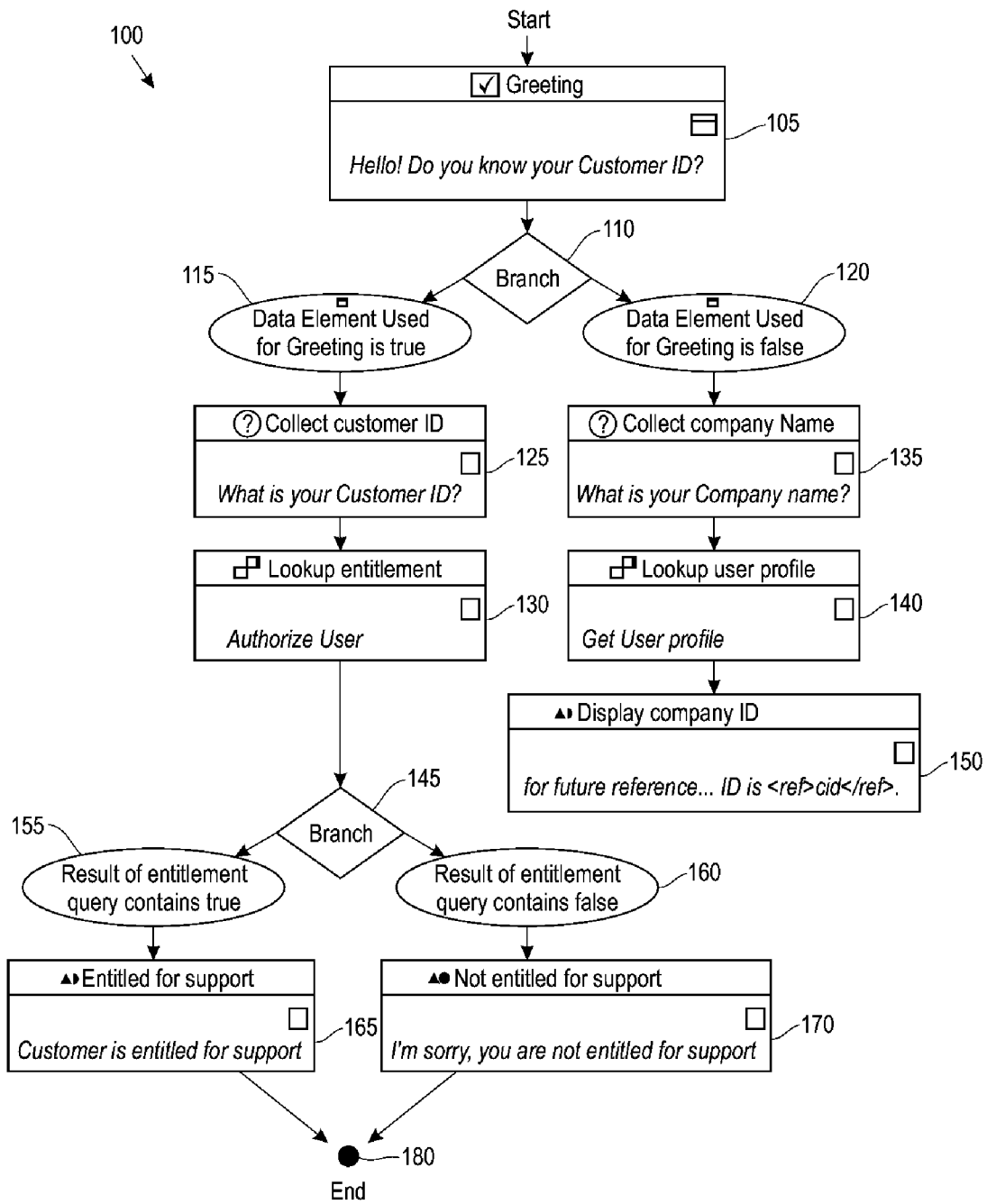
FIG. 1 is a block diagram of an example of a "base" Customer Call Flow.

FIG. 1 illustrates a "base" Customer Call Framework 100. The basic logical design of a Call Flow is a series of connected nodes. Nodes can consist of a request for information, a display of information, an execution branch, or a hook for triggering the execution of other call flows. During a call flow, these nodes are typically displayed one-at-a-time as a series of statements or questions, representing real-time interactions with a caller.

Typical requests for information might include the caller's name, caller's customer identification or account number or other information provided by the caller. Typical displays of information might include whether the caller is entitled to support or the level of support. An execution branch, as referred to as a decision branch, might occur after a caller provides information. For example, if the caller can provide user identification or account number they are entitled to support.

As discussed above, FIG. 1 illustrates an example of a Custom Call Flow 100. Proceeding to 105, the CSR greets the caller. For example, the greeting could be "Hello! Do you know your Customer ID?" or a similar phrase. At 110, the CSR determines if the caller knows the "Customer ID" data element. If yes, proceed to 115; if no, proceed to 120. At 125, the caller's Customer ID is collected. At 130, the CSR looks up if the caller is an Authorized User. At 145, the CSR branches depending on whether or not the result of the entitlement query is true[155] or false[160]. At 165, the CSR informs the caller that he or she is entitled to support. At 170, the 170, the CSR would inform the caller that they are not entitled to support if the entitlement query is false and the Call Flow 100 would end at 180. The statements, which would be read to the caller, would appear in a user interface.

If the user does not have a Customer ID at 105, then the CSR proceeds to 120 and 135. At 135, the CSR collects the company name. At 140, the CSR looks up the company's user profile. At 150, the Call Flow displays the Company ID and the CSR reports the company ID to the caller. The CSR then uses the Call Flow, at 130, to determine if the caller is authorized. In other words, whether his or her employer is an Authorized User.

At its most basic, a Call Flow is a series of questions and statements/answers/responses to gather and process information. As seen above, the questions and statements correspond to different steps in the Call Flow process. In many cases, this series of questions and answers can be thought of as a script.

Figure 2:
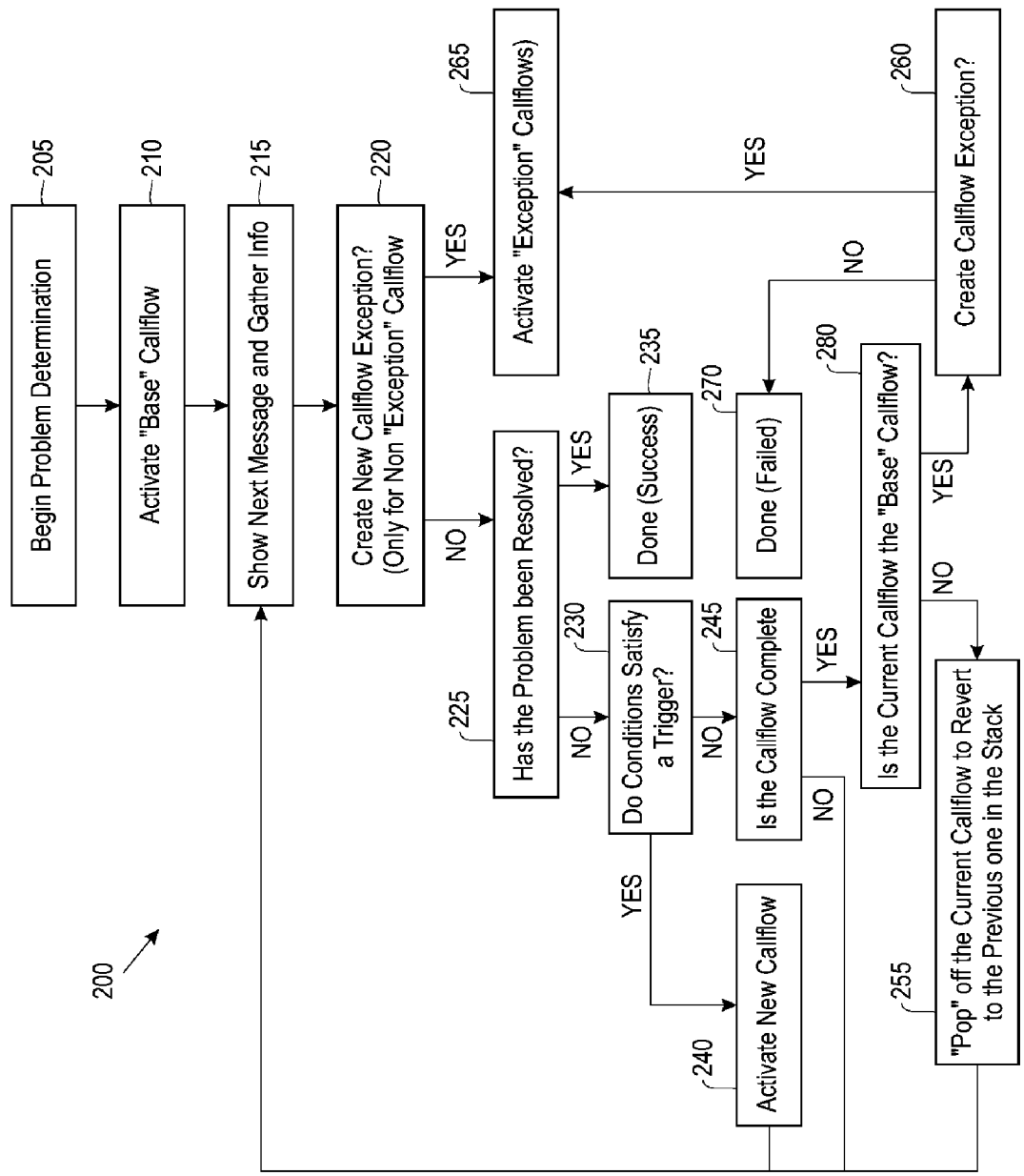
FIG. 2 is a block diagram that illustrates the Customer Call Flow where an "Exception" has occurred due to incorrect data or mischaracterization of a problem.

If the Call Flow 100 does not follow expected path, Call Flow 100 cannot be logically adapted to include the unexpected situation. Throughout this specification, this situation will be referred to as an "Exception." Thus, the User Interface can allow an Administrator to adapt a Call Flow to address "Exceptions." Exceptions Call Flow 200 is illustrated in FIG. 2. In a preferred embodiment, an "exception" would be present, so that a CSR could indicate the juncture at which the support path branches from the existing Call Flow.

Once the user/CSR has indicated to the system that an exception condition has occurred, the system begins monitoring the ensuing stages of the problem solving process. This is accomplished via the activation of a special call flow that is used for this situation. This exception call flow would be similar to existing call flows in the respect that it has the capability of displaying and receiving data in a sequential fashion, but would have a broader set of administrative capabilities which allow it to carry out the features described below.

This exception condition call flow would first record the stage of the originating call flow at which the exception occurred. It would also record a snapshot of the current data set in the originating call flow. This step is necessary, due to the nature of the call flow activation process in the Custom Call Flow ("CCF") framework.

The CCF framework allows call flows to "trigger" or activate other call flows if certain predefined criteria are met. Each call flow has access to certain global data elements, but also contains a set of local data, each of which can be used to trigger execution of other call flows. In this way, call flow logic, which is common to separate support processes, can be reused. This capability provides the usage of "base" call flows as a starting point for the support process. This is a powerful yet flexible feature as it minimizes the number of starting points in a support workflow, while accommodating the existence of an indefinite number of branching support paths.

By preserving, also referred to as retaining, the local data present in the originating call flow, the exception condition call flow provides for the possibility of returning execution to the originating call flow during appropriate conditions. This is important as the goal is the enhancement of existing call flows, not the constant creation of new ones. Creating new call flows for each error condition would result in competing call flows at run-time.

Examples of such conditions where it would be desirable to return to the original call flow could include:
1. If the exception condition call flow was activated by accident, using data satisfying the trigger conditions of the originating call flow will allow execution to return to it.
2. If at the end of the problem resolution, the necessary call flow enhancement does not entail a completely separate call flow, but merely some additional intermediary nodes in the original call flow, the error condition call flow can return execution to a later step of the originating call flow once conditions are back to that which is expected.

Once the exception condition call flow has been activated, the CSR or end-user adds or updates data in the available data set to reflect the changing state of the problem determination and resolution process dynamically. This requires integration with the client application, as special User Interface ("UI") elements will be required to support this capability. The elements may include:
1. The UI should provide access to the full set of data elements, and allow the user to update these data elements at all times.
2. The UI should provide the ability for users to add to the set of data elements.
3. The UI should provide the ability to detect when data elements have been modified.
4. The UI should provide an easy way for the CSR to document any messages or questions asked.

Any time a data element is added or updated, the UI should send the CCF run-time a "data changed" event. Each time the user adds or updates data, the exception condition call flow records the act as a new step in the call flow. The call flow should monitor the set of data during this process, and prompt the user for confirmation or clarification as needed, to ensure the data is correct once the problem is resolved. In particular, in cases where a new data element is added, the system should prompt the user to provide information about the element, so that the engine can categorize it and use it properly in the generated call flow. Additionally, the exception condition call flow also should allow the runtime engine to monitor the data set in case activation conditions for other call flows are met. If the activation conditions are met for another call flow, the exception call flow should give the user the option of starting it. If the user chooses to execute the new call flow, the exception condition call flow should record the event, and execute the new call flow in parallel with itself (this also requires UI integration, as all existing call flow UIs only allow a single executing call flow). The exception call flow will continue to monitor during the execution of the new call flow. If the user chooses to click the "exception." button on the new call flow during execution, the original exception call flow will take over as before, and merge its preserved state with the new state left by the new call flow. In this way there will only be one instance of the exception call flow, and one instance of a "normal" call flow executing at a given time. A "normal" call flow may also be referred to as a "base" call flow throughout this application. A base call flow may also be referred to as an "originating" call flow.

When the user is satisfied with the result of the recorded steps and sees that the problem is resolved, the user can stop recording by pressing a simple "Stop Recording and Save" button. Alternatively, the system could prompt the user after each update for whether the problem is now resolved. The choice of these alternatives can be configurable by the support provider.

Once the user responds positively to the question of whether the problem is now resolved, the CCF run-time terminates the exception call flow execution, and begins encoding the recorded steps as a call flow enhancement. The first step in this process is to optimize the data. This optimization can take several forms:
1. By analyzing which data elements changed more than once, and determining which of those changes are unnecessary. For example, a user may have changed a data element incorrectly, and corrected the value later, in which case only the final value is needed in the enhanced call flow. In other cases, a user may have changed a data element more than once based on natural conditions. An example of this case would be a data element representing an error code. A user could potentially have mistyped the value, later changing the value to the correct one. Alternatively, steps the user took to solve the problem may have solved the original error, but uncovered a different one, in which case the full history of changes to the error code are relevant. The system should clarify the data collected during the recording process as much as possible, as the user cannot be guaranteed to be available for clarifications during the optimization process. This optimization can occur based on information collected by prompting the user at the time of updating the data, or by categorizing the data elements at creation time for whether they are static or variable.
2. By analyzing the changed data for user involvement. If the data was generated via calculated, or fetched from remote data sources, the steps may be consolidated into an automated sequence of steps and encoded in the resulting call flow as automatically set values.
3. By analyzing the effect of activating other call flows in relation to the ultimate outcome. If activating another call flow resulted in an unchanged data set, or if a call flow was activated multiple times (indicating some "dead ends" in the problem determination process), these call flows may be removed from the sequence of steps since they did not contribute to the solution. Additionally, if activating another call flow led to a restart of the exception call flow, the data should be analyzed to determine if the call flow added any value to the problem determination.

The next step is to translate each of the recorded steps into a call flow. Depending on the type of node in the originating call flow, a branching condition or a trigger point can be used to provide an entry point to the enhanced call flow. If the node in the originating call flow was a display message containing incorrect information, a trigger point with criteria representing the correct information can be used to activate the new call flow. If the node in the originating call flow was a data collection node, a branch condition can be added to the node to provide entry to the new call flow steps. Once the entry point is established, the recorded steps are translated sequentially into display messages or prompts, depending on whether the recorded data consisted of a single value, or a collection (a single value can be represented with a display message, but a collection should allow the user to choose a value). As mentioned above, steps consolidated into automated sequences will be translated into call flow scripts that will run various operations such as the setting of fields or invoking backend services. When the new call flow is finished, the system can do an automatic comparison with other generated call flows that have not yet been activated and indicate any matches in the notification that will be sent to the administrator. This will help avoid multiple similar call flows being activated. In addition, this allows for metrics tracking that can help inform the administrators in parts of their call flows that are not well covered. For instance a particular version of a product, or a particular OS version may not be covered by the standard call flow authoring process that the administrators go through. Finally, the call flow is thoroughly and automatically tested with data that simulates the exception prior to its activation to ensure that the recorded and generated path of the call flow is indeed accurate. The test data is itself generated using the actual data that was provided during the course of the exception as a basis. A notification is then sent to a call flow administrator for an additional and optional manual verification if desired. These processes can be seen in block diagrams in FIG. 2 and FIG. 3.

Proceeding to 205, the Call Framework 200 is initialized. Typically, problem determination 205 begins when a caller contacts a call center.

Proceeding to 210, a base call flow is activated. Call Flow 100 is an example of a base call flow. Typically, a base call flow is a series of nodes where the caller and the CSR interact requesting and providing information. For example, the CSR might ask for Customer ID. The call would respond with a yes or no and this information would be used determine a caller's account number, level of support or other entitlement to support.

Proceeding to 215, the User Interface shows the series of a series of questions and answers to gather information.

Proceeding to 220, the CSR determines if an "Exception" Call Flow is necessary to address the issue raised by the caller. If no, proceed to 225; if yes, proceed to 265. At 225, the CSR determines if the problem has been resolved. If yes, proceed to 235 and the Call Flow 200 terminates successfully because the issue has been resolved. If no, proceed to 230 and determine if the conditions satisfy a trigger. If no, proceed to 246. If yes, proceed to 240 and activate a new call flow and proceed to 215.

At 245, the CSR determines if the call flow is complete. If no, proceed to 215. If yes, the CSR determines if the call flow is a base call flow at 250. If no, proceed to 255 and 215. If yes, the CSR determines whether to create a call flow "exception."

If no, the call has failed and proceeds to 270. If yes, the "exception" call flow is activated at 265.

Figure 3:
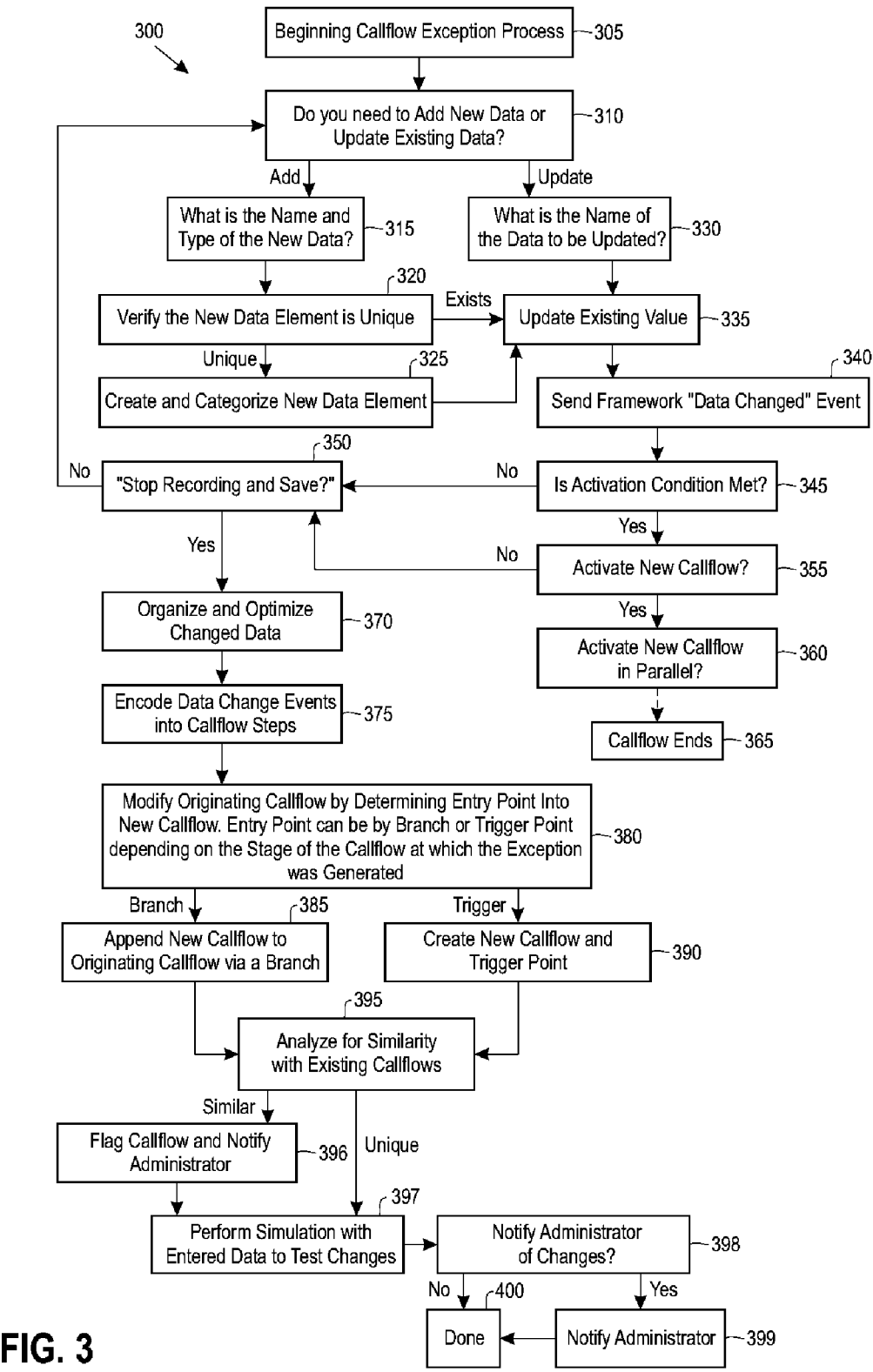
FIG. 3 is a block diagram that illustrates an "Exception" portion of the Call Flow.

FIG. 3 shows an Exception Call Flow 300.

If 265, seen in FIG. 2, is reached, Exception Call Flow 300 begins at 305, seen in FIG. 3. Once the user, typically the CSR, has indicted that the system has an exception condition, the system begins monitoring the ensuing steps. The exception condition would first record a "snapshot" of the current data set in the base call flow. This "snapshot" provides the possibility of returning execution to the original Base Call Flow 100. This is especially useful if the Exception Call Flow 300 has been activated accidentally.

Proceeding to 310, the system determines if it is necessary to add new data or update existing data. The process allows the user to alter the data set to reflect the changing state of the problem determination and resolution process dynamically. In the preferred embodiment, a User Interface (UI) supports this capability. Preferably, the UI should provide access to the full set of data elements and allow the user to update the data elements; the UI should also provide the ability to allow a user to add to the set of data elements; and, the UI should allow the CSR to document and record any information received or questions asked. If a new data element is to be added, proceed to 315. If a data element is to be updated, proceed to 330.

Proceeding to 315, the system receives the name and type of the new data. At 320 the system verifies that the data element is new. If the data element is new, proceed to 325 and create and categorize the new data element. Both 320 and 325 proceed to 335 and update the data set.

At 310, if the data element is to be updated, proceed to 330 and obtain the name of the data element to be updated and update the existing value at 335.

At 340, the system updates the Call Flow by sending the new data element or elements received at 310-335.

At 345, the system determines if an activation condition is met. An activation condition is met if an "exception" call flow is needed. If yes, proceed to 355. If no, proceed to 350.

At 355, the system determines if a new call flow should be activated. If yes, proceed to 360 and activate a new call flow in parallel. If no, proceed to 350 stop the call flow and save the call flow and data elements received. In the preferred embodiment, this is accomplished when a user presses a "Stop Recording and Save" button. If the user does not elect to stop recording and save [because the problem is not resolved], proceed to 310. If user presses "Stop Recording and Save," [because the problem is resolved] the system organizes and optimizes the changed data elements at 370. At 375, the system automatically encodes data change events into call flow steps. In the preferred embodiment, "dead ends" or unnecessary steps would be identified and not used to form an updated call flow.

At 380, the system modifies the base call flow, also known as an originating call flow, by determining the proper entry point for the new call flow. An entry point can be a branch or trigger point depending on the context in the originating call flow at which the exception was generated: If the exception was initiated at a stage in the originating call flow in which a branch node was being evaluated, and the cause of the exception is determined to be due to a missing branch condition, the branch in the originating call flow is updated for the new condition, such that the new condition is the entry point for the new call flow. Alternatively, if the exception was generated at a stage in the originating call flow with no branch node, or if the cause of the exception is determined to be irrelevant to the topic of a branch node, a trigger point can be used instead to define an entry point to the new call flow.

If the exception was generated via a branch, append the new call flow to originate the call flow via a branch at 385. If the exception was generated via a trigger point, create a new call flow and trigger point at 390.

Proceeding to 395, the system analyzes the new call flow for similarity with existing call flows. If the call flow is similar, proceed to 396. If the call flow is unique, proceed to 397.

Proceeding to 397, the system performs a simulation with entered data to test changes to the call flow that resulted from the exception. Proceeding to 398, the system may notify the administrator of the call flow changes. If yes, proceed to 399 and notify the administrator. If no, proceed to end the update at 400. Similarly, after the administrator is notified, the update ends at 400.

Throughout the description, for the purposes of explanation, numerous specific details are set forth in order to provide a thorough understanding of the present disclosure. It will be apparent, however, to one skilled in the art that the present disclosure may be practiced without some of these specific details. In some instances, well-known structures and devices are shown in diagram form to avoid obscuring the underlying principles of the present disclosure.

Exemplary Computer Architecture for Implementation of Systems and Methods

Figure 4:
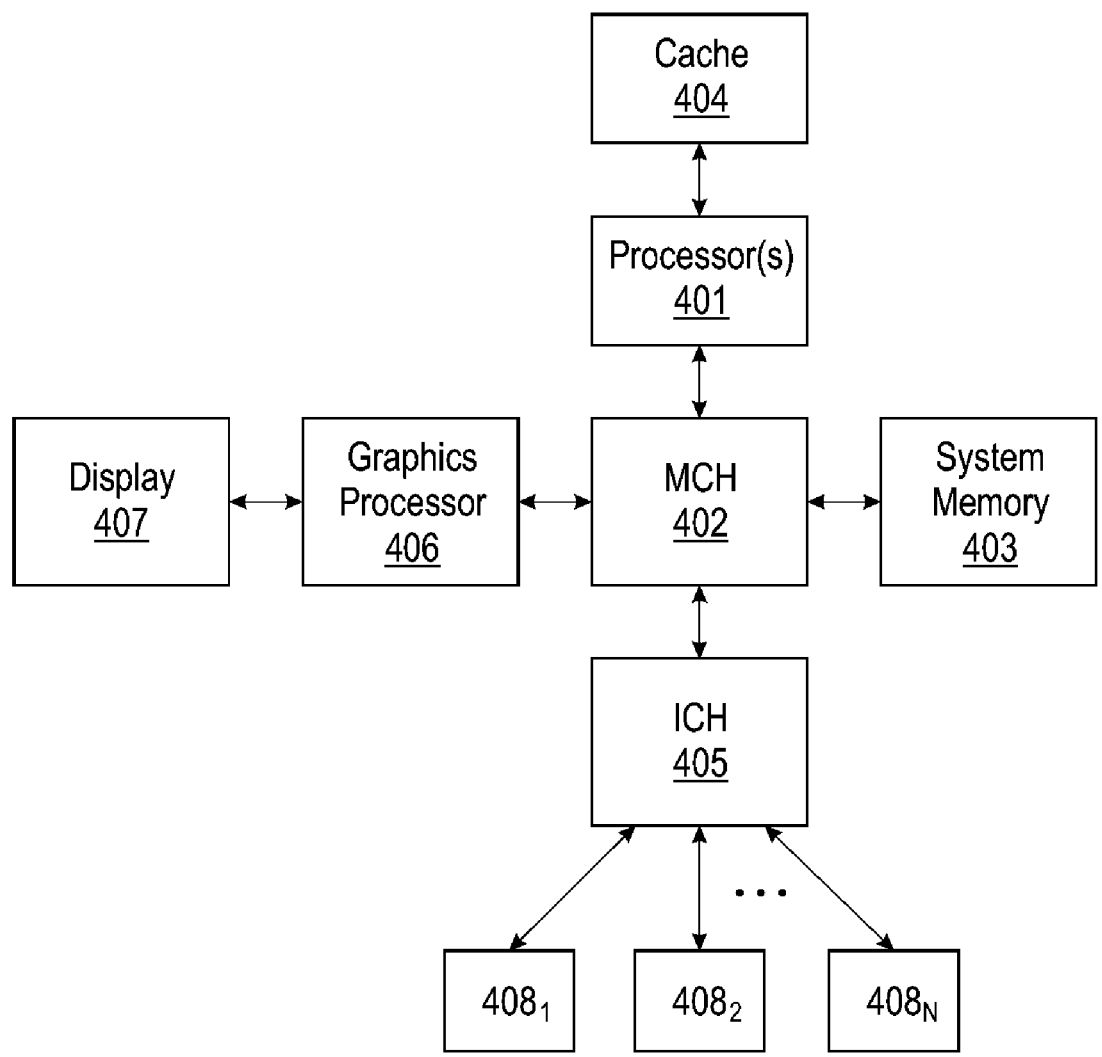
FIG. 4 is an example of computer architecture for implementing the embodiments as illustrated in FIGS. 1-3.

FIG. 4 illustrates an example of computer architecture for implementing as the system and methods illustrated in FIGS. 1-3 and described above. The exemplary computing system of FIG. 4 includes: 1) one or more processors 401; 2) a memory control hub (MCH) 402; 3) a system memory 403 (of which different types exist such as DDR RAM, EDO RAM, etc,); 4) a cache 404; 5) an I/O control hub (ICH) 405; 6) a graphics processor 406; 7) a display/screen 407 (of which different types exist such as Cathode Ray Tube (CRT), Thin Film Transistor (TFT), Liquid Crystal Display (LCD), DPL, etc.); and/or 8) one or more I/O devices 408.

The one or more processors 401 execute instructions in order to perform whatever software routines the computing system implements. The instructions frequently involve some sort of operation performed upon data. Both data and instructions are stored in system memory 403 and cache 404. Cache 404 is typically designed to have shorter latency times than system memory 403. For example, cache 404 might be integrated onto the same silicon chip(s) as the processor(s) and/or constructed with faster SRAM cells whilst system memory 403 might be constructed with slower DRAM cells. By tending to store more frequently used instructions and data in the cache 404 as opposed to the system memory 403, the overall performance efficiency of the computing system improves.

System memory 403 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 403 prior to their being operated upon by the one or more processor(s) 401 in the implementation of a software program. Similarly, data that a software program determines should be sent from the computing system to an outside entity through one of the computing system interfaces, or stored into an internal storage element, is often temporarily queued in system memory 403 prior to its being transmitted or stored.

The ICH 405 is responsible for ensuring that such data is properly passed between the system memory 403 and its appropriate corresponding computing system interface (and internal storage device if the computing system is so designed). The MCH 402 is responsible for managing the various contending requests for system memory 403 access amongst the processor(s) 401, interfaces and internal storage elements that may proximately arise in time with respect to one another.

One or more I/O devices 408 are also implemented in a typical computing system. I/O devices generally are responsible for transferring data to and/or from the computing system (e.g., a networking adapter); or, for large-scale non-volatile storage within the computing system (e.g., hard disk drive). ICH 405 has bi-directional point-to-point links between itself and the observed I/O devices 408.

Referring back to FIGS. 1-4, modules of the different embodiments of the described system may include software, hardware, firmware, or any combination thereof. The modules may be software programs available to the public or special or general-purpose processors running proprietary or public software. The software may also be a specialized program written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 1-3, embodiments of the invention may include the various processes as set forth above. The processes may be embodied in machine-executable instructions that cause a general-purpose or special-purpose processor to perform certain steps. Alternatively, these processes may be performed by specific hardware components that contain hardwired logic for performing the processes, or by any combination of programmed computer components and custom hardware components.

For the exemplary system illustrated in FIGS. 1-4, embodiments of the invention may include the various modules as set forth. Each module may be implemented in hardware, software, firmware, or a combination thereof. The modules may be connected in different order and/or connect to other modules. Not all modules may be needed, or other modules may be included in implementing embodiments of the invention.

Embodiments of the invention do not require all of the various processes presented, and it may be conceived by one skilled in the art as to how to practice the embodiments of the invention without specific processes presented or with extra processes not presented.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A method for adapting an existing call flow wherein the call flow further comprises an associated data set, comprising:

activating the existing call flow, the existing call flow generating a series of questions designed to obtain information from a caller;

determining if an exception condition has occurred;

allowing a user to activate an exception call flow in response to the exception condition, wherein the user is a customer service representative;

retaining the data set associated with the call flow when the exception condition occurred;

adapting the data set such that the call flow addresses the exception condition;

analyzing the adapted data set to determine if it is unique;

modifying the existing call flow to incorporate the adapted data set if the adapted data set is unique; and allowing the user to return to the existing call flow if the exception condition was triggered accidentally.

2. The method of claim 1 further comprising employing a user interface to modify the existing data set.

3. The method of claim 1 further comprising providing an ability for the user to add to the set of data elements.

4. The method of claim 1 further comprising monitoring the data set during the exception condition.

5. The method of claim 1 further comprising recording the call flow after the exception condition is initiated.

6. The method of claim 1 further comprising gathering information sufficient to determine if the caller is entitled to support and terminating the call flow if the caller is not entitle to support.

7. A computer implemented system for adapting an existing call flow wherein the call flow further comprises an associated data set, comprising:

a module to activate the existing call flow, the existing call flow generating a series of questions designed to obtain information from a caller;

a module to determine from the existing call flow if an exception condition has occurred;

a module, upon receiving a determination of an exception condition, to allow a user to activate an exception call flow in response to the exception condition, wherein the user is a customer service representative;

a storage module to retain the data set associated with the call flow when the exception condition occurred;

a module to adapt the data set such that the call flow addresses the exception condition;

a module to analyze the adapted data set to determine if it is unique; and a module to modify the existing call flow to incorporate the adapted data set if the adapted data set is unique;

wherein the user interface is configured to allow the user to return to the existing call flow if the exception condition was triggered accidentally.

8. The system of claim 7 further comprising a user interface to modify the existing data set.

9. The system of claim 8 wherein the user interface is configured to allow the user to add to the set of data elements.

10. The system of claim 8 further comprising a module to monitor the data set during the exception condition.

11. The system of claim 8 wherein the user interface is configured to prompt the user for confirmation to ensure the data set after the exception condition is resolved.

12. The system of claim 7 further comprising a module to record the call flow after the exception condition is initiated.

13. The system of claim 7 further comprising a decision module to gather information sufficient to determine if the caller is entitled to support and terminating the call flow if the caller is not entitle to support.

14. A non-transitory computer useable storage medium to store a computer readable program, wherein the computer readable program, when executed on a computer, causes the computer to perform operations for adapting an existing call flow, wherein the call flow further comprises an associated data set, comprising:

activating the existing call flow, the existing call flow generating a series of questions designed to obtain information from a caller;

determining if an exception condition has occurred;

allowing a user to activate an exception call flow in response to the exception condition, wherein the user is a customer service representative;

retaining the data set associated with the call flow when the exception condition occurred;

adapting the data set such that the call flow addresses the exception condition;

analyzing the adapted data set to determine if it is unique;

modifying the existing call flow to incorporate the adapted data set if the adapted data set is unique; and allowing the user to return to the existing call flow if the exception condition was triggered accidentally.

15. The non-transitory computer useable storage medium of claim 14 further comprising employing a user interface to modify the existing data set.

16. The non-transitory computer useable storage medium of claim 14 further comprising providing an ability for the user to add to the set of data elements.

17. The non-transitory computer useable storage medium of claim 14 further comprising providing the user full access to the data set.

18. The non-transitory computer useable storage medium of claim 14 further comprising monitoring the data set during the exception condition.

19. The non-transitory computer useable storage medium of claim 18 further comprising prompting the user for confirmation to ensure the data set after the exception condition is resolved.

20. The non-transitory computer useable storage medium of claim 14 further comprising recording the call flow after the exception condition is initiated.

21. The non-transitory computer useable storage medium of claim 20 further comprising ending the recording of the call flow after the exception condition is resolved.

22. The non-transitory computer useable storage medium of claim 14 further comprising gathering information sufficient to determine if the caller is entitled to support and terminating the call flow if the caller is not entitle to support.

* * * * *